US010260928B2

United States Patent
Welle et al.

(10) Patent No.: US 10,260,928 B2
(45) Date of Patent: Apr. 16, 2019

(54) DETERMINING A TOPOLOGY OF THE SURFACE OF A MATERIAL FILLED INTO A CONTAINER

(71) Applicant: VEGA GRIESHABER KG, Wolfach (DE)

(72) Inventors: Roland Welle, Hausach (DE); Levin Dieterle, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 244 days.

(21) Appl. No.: 15/118,301

(22) PCT Filed: Feb. 11, 2014

(86) PCT No.: PCT/EP2014/052641
§ 371 (c)(1),
(2) Date: Aug. 11, 2016

(87) PCT Pub. No.: WO2015/120883
PCT Pub. Date: Aug. 20, 2015

(65) Prior Publication Data
US 2017/0184437 A1  Jun. 29, 2017

(51) Int. Cl.
*G01S 13/02* (2006.01)
*G01S 13/42* (2006.01)
(Continued)

(52) U.S. Cl.
CPC ............ *G01F 23/284* (2013.01); *G01S 13/42* (2013.01); *G01S 13/88* (2013.01); *G01S 13/89* (2013.01);
(Continued)

(58) Field of Classification Search
CPC .................................................. G01F 23/284
See application file for complete search history.

(56) References Cited

U.S. PATENT DOCUMENTS 4,219,814 A * 8/1980 Johnson .................... C21B 7/24
266/86
4,332,374 A * 6/1982 Kremer ..................... G01S 7/03
266/100
(Continued)

FOREIGN PATENT DOCUMENTS

DE  10 2004 041 857 A1  3/2006
DE  10 2010 014 457 A1  10/2011

OTHER PUBLICATIONS

International Search Report dated Nov. 12, 2014, in PCT/EP2014/052641 filed Feb. 11, 2014.
(Continued)

*Primary Examiner* — Peter M Bythrow
(74) *Attorney, Agent, or Firm* — Oblon, McClelland, Maier & Neustadt, L.L.P.

(57) ABSTRACT

A fill level measurement device for determining a topology of a filling material surface in a container including an antenna apparatus, a receiver and control circuitry. An emission angle of the antenna apparatus and a spatial position of the antenna apparatus relative to the filling material surface is settable by the control circuitry. A resultant emission direction of the fill level measurement device is changeable by the control circuitry by controlling a position of the antenna apparatus and by controlling an emission and/or receiving angle of the antenna apparatus.

17 Claims, 5 Drawing Sheets

(51) Int. Cl.
*G01S 13/88* (2006.01)
*G01S 13/89* (2006.01)
*G01F 23/284* (2006.01)

(52) U.S. Cl.
CPC .............. *G01S 2013/0245* (2013.01); *G01S 2013/0254* (2013.01)

(56) References Cited

U.S. PATENT DOCUMENTS

| | | | | |
|---|---|---|---|---|
| 5,337,289 | A * | 8/1994 | Fasching | G01F 23/2962 340/612 |
| 5,609,059 | A * | 3/1997 | McEwan | G01F 23/284 342/124 |
| 6,288,672 | B1 | 9/2001 | Asano et al. | |
| 6,634,234 | B1 * | 10/2003 | Haas | G01F 23/284 367/138 |
| 6,986,294 | B2 * | 1/2006 | Fromme | G01B 11/24 73/865.8 |
| 7,265,558 | B1 * | 9/2007 | Penndal | G01F 23/284 324/637 |
| 7,408,501 | B2 * | 8/2008 | Rolfes | G01F 23/284 340/612 |
| 8,159,386 | B2 * | 4/2012 | Malinovskiy | G01F 23/284 342/118 |
| 8,217,831 | B2 * | 7/2012 | Poussin | B01J 8/0015 342/118 |
| 2006/0015292 | A1 * | 1/2006 | Lubcke | G01D 3/08 702/183 |
| 2006/0201246 | A1 * | 9/2006 | Rolfes | G01B 15/04 73/290 V |
| 2007/0028684 | A1 * | 2/2007 | Benz | G01F 23/284 73/314 |
| 2007/0084282 | A1 * | 4/2007 | Hagg | G01F 23/284 73/290 R |
| 2008/0083281 | A1 * | 4/2008 | Rolfes | G01F 23/284 73/627 |
| 2009/0093983 | A1 * | 4/2009 | Trafford | G01F 23/284 702/100 |
| 2009/0299662 | A1 * | 12/2009 | Fehrenbach | G01F 23/28 702/55 |
| 2010/0019952 | A1 * | 1/2010 | Poussin | B01J 8/0015 342/124 |
| 2010/0101317 | A1 * | 4/2010 | Ashrafzadeh | G01F 23/0061 73/149 |
| 2011/0272866 | A1 * | 11/2011 | Shameli | F27B 3/085 266/78 |
| 2012/0281096 | A1 * | 11/2012 | Gellaboina | G01F 23/292 348/163 |
| 2013/0269414 | A1 * | 10/2013 | Ferraro | G01F 23/284 73/1.73 |

OTHER PUBLICATIONS

Written Opinion dated Nov. 12, 2014 in PCT/EP2014/052641 (submitting English translation only).

* cited by examiner

DETERMINING A TOPOLOGY OF THE SURFACE OF A MATERIAL FILLED INTO A CONTAINER

FIELD OF THE INVENTION

The invention relates to fill level measurement devices and to the determination of fill levels in containers by determining a surface topology. The fields of use of the invention can furthermore be in the field of object monitoring or mass flow recording. The invention further relates to a method for determining a topology of a filling material surface.

PRIOR ART

Recording a topology of a filling material surface can advantageously be usable in particular when measuring bulk materials and the frequently resultant angles of repose and removal hoppers either inside or outside closed containers. Recording a surface topology can even be used to determine fill levels or volumes in moving liquids. Such moving liquids arise for example when using stirrers and from the flow patterns generated therefrom on the liquid surface (tornados) in a non-trivial manner. Determining the surface topology can allow conclusions to be drawn about additional variables, such as the viscosity or degree of mixing of a filling material, taking into account the speed of the stirrer if necessary.

Methods for contactlessly scanning a surface can, for example, be based on the principle of a signal emitted towards a surface being reflected by this surface and a propagation time and/or signal strength of the reflected signal being evaluated. In order to record a topology of a filling material surface sufficiently accurately, it may be necessary to carry out several measurements towards specific regions of a filling material surface, possibly increasing the complexity and costs of such measurement devices or measurement methods.

SUMMARY OF THE INVENTION

An object of the present invention can be considered that of reducing the time required for determining a topology of a filling material surface. Another object can be considered that of reducing the complexity and costs of fill level measurement devices of this type.

This object is achieved by the subject matter of the independent claims. Additional embodiments of the invention can be found in both the dependent claims and the following description.

One aspect of the invention proposes a fill level measurement device for determining a topology of a filling material surface in a container. The fill level measurement device comprises an antenna apparatus for emitting electromagnetic signals and/or receiving echoes of said signals. Furthermore, the fill level measurement device comprises a receiving means and a control unit, the antenna apparatus being fastened to the receiving means and it being possible to electronically set one or more emission and/or receiving angles of the antenna apparatus relative to a longitudinal axis of the antenna apparatus. The receiving means is designed to set a position of the antenna apparatus relative to the filling material surface. The control unit is designed to provide the antenna apparatus with electromagnetic signals and/or to receive echoes of said signals from the antenna apparatus. The control unit is further designed to change a resultant emission and/or receiving direction of the fill level measurement device relative to the container such that a spatial position of the antenna apparatus and the emission and/or receiving angle of the antenna apparatus is controlled.

In other words, a resultant emission and/or receiving direction of the fill level measurement device is set from a combination of electronically changing the emission and/or receiving direction of the antenna apparatus, for example, and mechanically moving the antenna apparatus in space.

It should be pointed out in this context that the emission and/or receiving direction of the antenna of a fill level measurement device can be electronically changed in analogue form, for example by using antenna arrays in conjunction with suitable phase shifter circuits or analogue switches, and in digital form, for example by means of antenna arrays in conjunction with numerical calculations based on digitalised receiving curves or echo signals.

The fact that, by means of combining mechanically positioning the antenna apparatus with electronically setting the emission and/or receiving angle of the antenna apparatus, the measurement time required for recording echo signals or echo curves can be reduced in comparison with a purely mechanical solution, and at the same time the complexity of an electronic construction, for example a high-frequency circuit, can be kept within acceptable cost limits in comparison with a purely electronically pivoted solution, can be considered to be an advantage. In other words, the present invention combines the advantages of mechanically changing the position of an antenna arrangement with the advantages of electronically changing the receiving angle (and/or optionally the emission angle) of an antenna arrangement, for example by means of digital beamforming or by means of analogue phase shifters in conjunction with antenna arrays, it being advantageously possible to use patch antennas in this case. As a result, component complexity can be reduced whilst simultaneously improving a maximum achievable measurement rate.

In this case, the position of the antenna apparatus can, for example, be the spatial position of the antenna apparatus in three-dimensional space, for example in the inner space of a container, above a filling material surface. This also includes the possibility of rotation about its own axis of rotation or even a translational movement.

The topology of a filling material surface can be understood to mean the surface of a bulk material or the course or shape of the surface of a bulk material that results from bulk material heaping up in or being removed from a container. Surfaces of this kind, for example, can also occur in bulk material on conveyor belts or irregularly shaped surfaces of moving liquids. The emitted electromagnetic signals can be, for example, radar signals in the C band, K band or W band (for example 6 GHz, 24 GHz, 79 GHz), which are suitable for being reflected by the filling material surface and then being received by the fill level measurement device. The topology can be determined on the basis of the time-of-flight or FMCW method, for example. It may also be possible to combine the methods set out with known ultrasonic measurement technology.

An antenna apparatus can be a patch antenna for example, which combines a plurality of individual, small combined radiators (patches). These patches can for example be arranged on a common carrier or as a metal layer of a printed circuit board.

An emission and/or receiving angle of the antenna apparatus can be understood to be the angle formed by a main emission direction of the antenna apparatus relative to a longitudinal extent of the antenna apparatus. The emission and/or receiving angle can therefore be changed without mechanically moving or changing a position of the antenna apparatus in space. The emission angle can for example be electronically set by means of overlaid effects (constructive and destructive interferences) in combination with phase shift. When receiving signals, the receiving direction can be changed by a phase shift of the individual receiving channels of an array antenna relative to one another by means of known algorithms for digital beamforming.

A receiving means can for example be a movable mount that makes it possible to movably connect the antenna apparatus to a wall of the container, so that a defined position of the antenna apparatus relative to a container can be created. In one example, the receiving means is a vertical rod which is mounted so as to be rotatable about its longitudinal axis, and to which the antenna apparatus is attached at an end of said rod directed towards the filling material surface. The receiving means can assist with mechanically moving the antenna apparatus, for example by rotating the antenna apparatus about an axis of rotation.

The emission and/or receiving angle of the antenna should preferably be changed in a direction which does not correspond to a movement direction of the mechanical movement of the antenna apparatus. Ideally, the two directional axes are perpendicular to one another. This can then allow a surface to be recorded, for example by a resultant, two-dimensional change to a resultant emission and/or receiving direction of the fill level measurement device in an X direction and a Y direction.

According to an embodiment of the invention, the control unit is designed to set a specific resultant emission and/or receiving direction of the fill level measurement device by setting the mechanical position of the antenna apparatus and by setting the emission and/or receiving angle of the antenna apparatus. In other words, by electronically setting an emission and/or receiving angle of the antenna apparatus in a targeted manner and by mechanically positioning the antenna apparatus in space, a specific resultant emission and/or receiving direction of the fill level measurement device can be set, and therefore a defined partial surface can be ascertained. For example, specific position/emission and/or receiving angle combinations can be stored in order to scan defined partial surfaces.

According to an embodiment of the invention, a plurality of emission and/or receiving angles are electronically set using analogue phase shifters and/or analogue switches.

According to an embodiment of the invention, a plurality of emission and/or receiving angles are electronically set using digital beamforming methods.

According to an embodiment, the receiving means comprises an actuator for moving the antenna apparatus and the control unit is designed to control the actuator.

The fact that it may be possible to move the antenna apparatus or the receiving means in a targeted manner in order to set a specific position of the antenna apparatus can be considered to be an advantage. In this case, the actuator can be arranged at different points on the receiving means. This can also mean, in one example, that the receiving means itself (without the actuator) does not move, but the antenna apparatus can be directly attached to the actuator.

According to an embodiment, the receiving means is designed to rotate the antenna apparatus about an axis of rotation and the actuator is a motor for rotating the receiving means. In this advantageous embodiment, an antenna apparatus requiring comparatively less space can record a large region in a container.

According to an embodiment of the invention, the antenna apparatus is a unidimensional array antenna that has an elongate shape.

According to an embodiment, the longitudinal extent of the antenna apparatus is arranged obliquely to the axis of rotation such that an angle between the longitudinal extent of the antenna apparatus and the axis of rotation does not equal 90°. Such an oblique arrangement can be advantageous in that surface regions of a filling material surface that are further away from the fill level measurement device can also be effectively recorded by means of digital beamforming, in particular in combination with a rotational movement of the antenna arrangement.

According to an embodiment of the invention, the angle between the longitudinal extent of the antenna apparatus and the axis of rotation is more than 45°. This can be advantageous in that, in this angular range, a topology of a filling material surface can be recorded in a very effective manner, even with very different fill levels.

According to an embodiment of the invention, the control unit and the receiving means are designed to change the angle. This can, for example, be done by an additional actuator, which moves the antenna apparatus relative to the receiving means or sets a specific angle. This can allow for measurement results to be more accurate, since different fill levels and topologies can be better accounted for.

According to an embodiment of the invention, the control unit is designed to set the emission and/or receiving angle of the antenna apparatus by means of digital beamforming. In this case, electronically changing the different high-frequency signals and overlaying the emitted/received waves can influence a resultant emission and/or receiving direction of the antenna apparatus. Alternatively or in addition, this change can also be made to low-frequency signals in the intermediate frequency range which are pre-processed according to known methods. For example, a plurality of individual radiators or antenna elements which are electronically coupled to one another can be used. Digital beamforming can be considered to be advantageous in that it can be possible to change the emission angle and/or the receiving angle of the antenna apparatus without mechanically moving the antenna apparatus.

According to an embodiment of the invention, the antenna apparatus is a unidimensional array antenna and has an elongate shape. One advantage of such an antenna arrangement is its comparatively simple construction, which may require an economically viable amount of effort with regard to the necessary electronic components. The elongate shape allows a direction, for example a dimension in the X or Y direction, to be advantageously recorded by changing the emission and/or receiving angle of the antenna. A mechanical movement combined therewith can, in this example, record the other dimension in each case in order to sample a surface.

According to an embodiment of the invention, the antenna apparatus comprises a parabolic trough, a dielectric cylindrical lens and/or widened patches or antenna elements in order to improve focussing. As a result, focussing properties of the antenna apparatus can be advantageously improved, for example in order to be able to distinguish specific partial surfaces of the filling material surface from other partial surfaces more accurately. Better focussing can allow the size of the partial surfaces to be reduced and can therefore allow for higher resolution and/or measurement accuracy when determining the topology of the filling material surface to be achieved.

According to an embodiment of the invention, the fill level measurement device further comprises an evaluation unit designed to calculate a topology of the filling material surface on the basis of the echo signals received by the antenna apparatus. This evaluation unit can, for example, comprise a processor having a memory unit that, together with suitable software, calculates a resultant topology of the filling material surface from the plurality of echo signals obtained. The fact that the fill level measurement device makes already pre-processed information available for subsequent applications can be considered to be an advantage. Furthermore, this can allow for an optimisation of the evaluation unit with regard to calculating topologies of filling material surfaces.

According to an embodiment of the invention, the fill level measurement device comprises a position sensor designed to detect a spatial position of the antenna apparatus relative to the container and to provide the control unit with corresponding spatial positional information relating to the antenna apparatus. Such positional information relating to the antenna apparatus may be essential for determining a position of the partial surface of the filling material surface measured in each case. For example, a position sensor of this type can be arranged in an actuator that ascertains the angular position of a drive shaft, for example.

According to another aspect of the invention, a fill level measurement device for recording a topology is provided, the fill level measurement device drawing the energy it requires to do so only via a two-conductor connection, and the two-conductor connection being designed for communication, in particular for outputting at least one topology measured value or a measured value derived therefrom (e.g. the mass in the container). Furthermore, the fill level measurement device can comprise one, several or all the features described above and in the following.

One aspect of the invention proposes a method for determining a topology of a filling material surface in a container. The method comprises the following steps: providing a radiometric fill level measurement device, setting a first position of the antenna apparatus by means of the control unit, and setting a first emission angle of the antenna apparatus by means of the control unit. In this case, the position of the receiving means and the emission angle of the antenna apparatus are set such that a resultant emission direction of the fill level measurement device is directed towards a first partial surface of the filling material surface. In additional steps, a first electromagnetic signal is emitted towards the filling material surface by means of the control unit and the antenna apparatus, a first echo signal of the first electromagnetic signal is received by means of the antenna apparatus and the control unit; and a second position of the receiving means and of the antenna apparatus is set by means of the control unit and/or a second emission angle of the antenna apparatus is set. In this case, a resultant emission direction of the fill level measurement device is directed towards a second partial surface of the filling material surface. In additional steps, a second electromagnetic signal is emitted towards the second partial surface of the filling material surface by means of the control unit and the antenna apparatus, and a second echo signal of the second electromagnetic signal is received by means of the antenna apparatus and the control unit.

One aspect of the invention proposes a method for determining a topology of a filling material surface in a container. The method comprises the following steps: providing a radiometric fill level measurement device, setting a first position of the antenna apparatus by means of the control unit, setting a plurality of emission and/or receiving angles of the antenna apparatus and determining a plurality of echo signals by means of the control unit. In additional steps, a second position of the antenna apparatus is set by means of the control unit, a plurality of emission and/or receiving angles of the antenna apparatus are set and a plurality of additional echo signals are determined by means of the control unit.

In one embodiment of the invention, the method comprises the additional step of calculating, by means of the evaluation unit, a topology of a filling material surface on the basis of the echo signals received by the antenna apparatus.

One aspect of the invention proposes the use of a fill level measurement device or determining a viscosity of a moving liquid.

Another aspect of the invention proposes the use of a fill level measurement device for determining a mass flow of a bulk material on a conveyor belt.

One aspect of the invention proposes the use of a fill level measurement device for determining the mass or volume of a medium.

The volume can be calculated in a simple manner in the fill level measurement device if the topology is known and container data has been input by the user. The mass can also be ascertained by the fill level measurement device from the volume when the density of the medium is known.

Embodiments of the invention will be described in detail in the following with reference to the accompanying drawings.

BRIEF DESCRIPTION OF THE DRAWINGS

The drawings are merely schematic and are not to scale. The same reference numerals describe similar or identical parts.

DETAILED DESCRIPTION OF EMBODIMENTS

Figure 1:
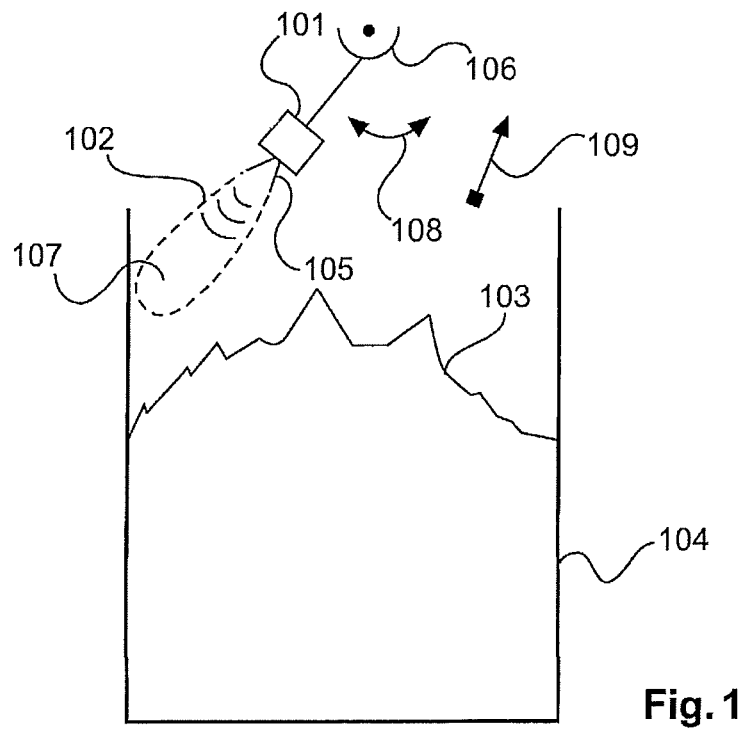
FIG. 1 shows an example of a fill level measurement device in a bulk material container, in which an emission direction is mechanically set.

FIG. 1 shows an example of a fill level measurement device 101, which is attached above a filling material surface 103. The filling material surface 103 can be, for example, bulk material in a container 104, as a result of which an irregular structure or shape of the filling material surface 103 can form. The fill level measurement device 101 captures an image of the reflection behaviour in the container 104 by emitting a signal 102 towards the filling material surface 103. The fill level measurement device 101 or at least one antenna apparatus 105 of the fill level measurement device 101 can be capable of changing an emission and/or receiving direction 107 of the fill level measurement device 101 by means of a correspondingly configured, mechanical adjustment apparatus 106 such that the entire filling material surface 103 of the medium in the container can be measured within a measuring cycle. For this purpose, for example, the device can be pivoted in the X direction 108 and in the Y direction 109. The fill level measurement device 101 determines a topology of the filling material surface 103 from a plurality of the echo signals or echo curves recorded in the X direction 108 and the Y direction 109. This can, for example, be the vertical profile of the filling material surface 103 as a function of the particular position, which for example can be clearly defined by means of Cartesian coordinates X and Y.

Figure 2:
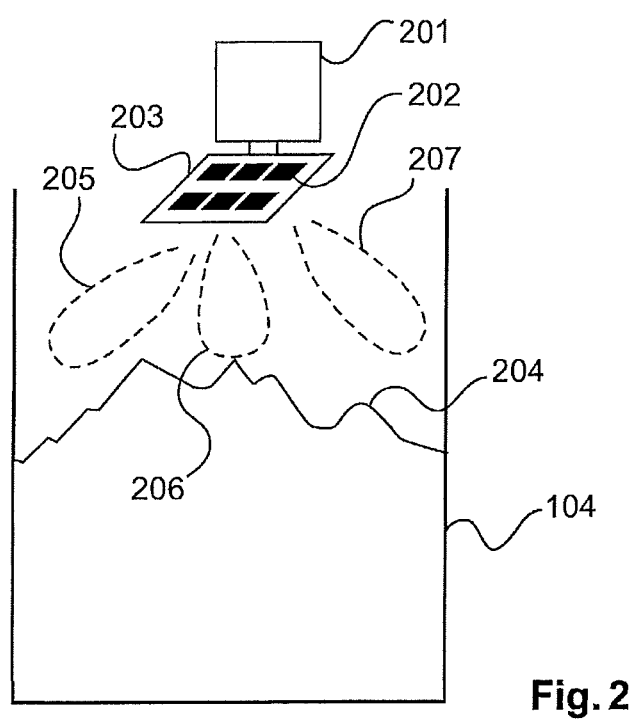
FIG. 2 shows an example of a fill level measurement device in a bulk material container, in which an emission direction is electronically set.

FIG. 2 shows a further possibility for changing an emission direction of a fill level measurement device 201. In contrast to the fill level measurement device 101 in FIG. 1, the fill level measurement device 201 comprises a plurality of antenna elements 202, which can be formed as part of a single antenna apparatus 203 or can even be distributed on a plurality of separate antenna elements 202. In order to determine a topology of a filling material surface 204 of a container 104, the fill level measurement device 201 can change a main emission direction 205, 206, 207 either by electronically changing the actuation signals (for example by changing the phase position of individual actuation signals using analogue phase shifters, or by switching off individual actuation signals in a targeted manner by means of analogue switches) of the individual antenna elements 202 in a targeted manner and/or by digitally calculating (digital beamforming) the echo signals or echo curves recorded by the individual antenna elements 202. For example, arrangements of this type can be designed as an antenna array and a main emission and/or main receiving direction 205, 206, 207 can, for example, be changed by means of digital beamforming.

Figure 3:
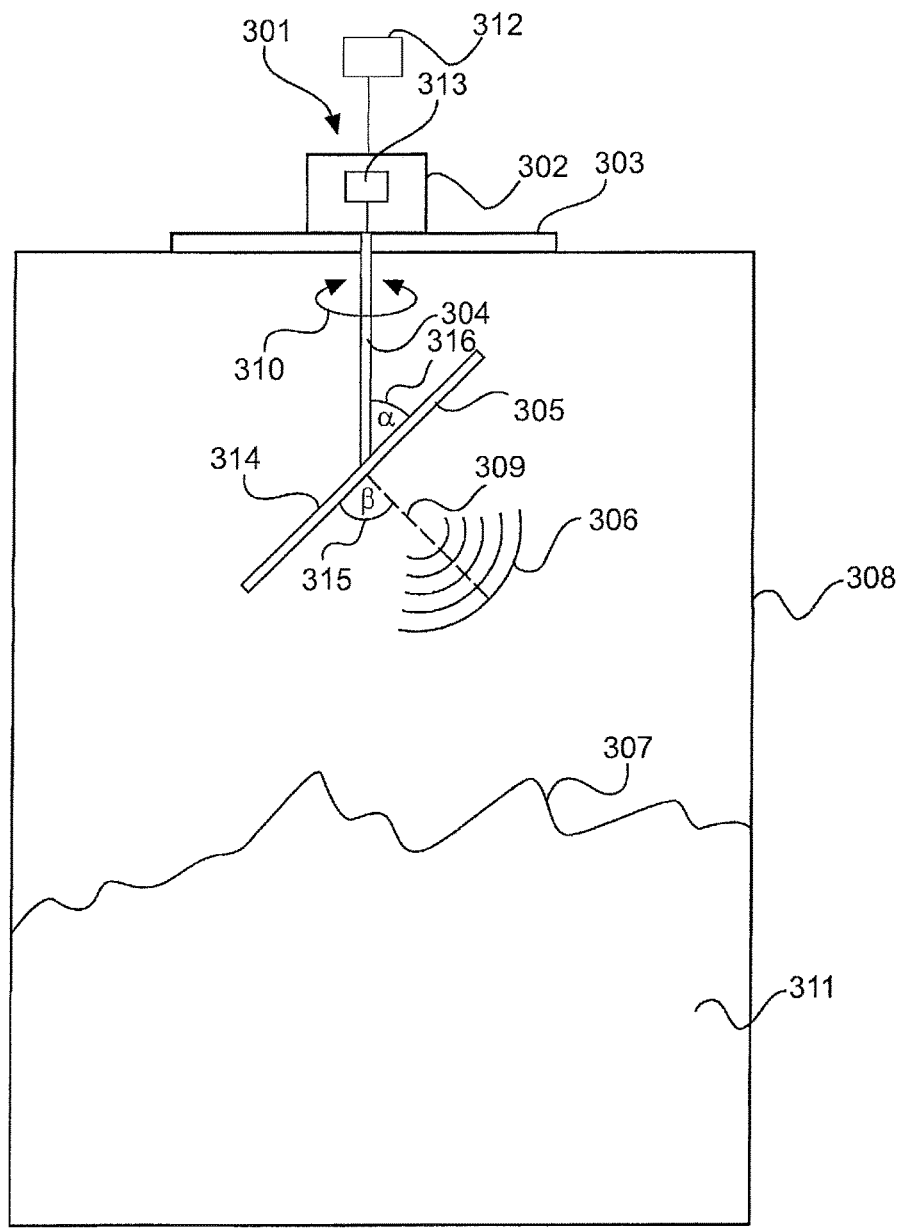
FIG. 3 shows a fill level measurement device according to an embodiment of the invention for determining a topology of a filling material surface in a container, in which an emission and/or receiving direction is set both mechanically and electronically.

FIG. 3 shows an example of a fill level measurement device 301 according to the invention. The fill level measurement device 301 comprises an actuator 313, a processor coupling 303, a receiving means 304, in this case a rotatable shaft, and an antenna apparatus 305. The processor coupling 303 can be used to mechanically fasten the fill level measurement device 301 to the container. The actuator 313 is designed to move the antenna apparatus 305. In the example shown here, the actuator 313 is a motor, which rotates the shaft together with the antenna apparatus 305. A control unit 312 is designed to control the actuator 313, to provide the antenna apparatus 305 with high-frequency signals and to receive said signals therefrom. The antenna apparatus 305 emits the signals 306 generated by the control unit 312 towards a filling material surface 307. The control unit 312 is further designed to control a position of the antenna apparatus 305. Furthermore, the control unit 312 is designed to electronically set an emission and/or receiving angle 315 or main emission and/or main receiving direction of the antenna apparatus 305 so that a resultant emission and/or receiving direction of the fill level measurement device 301 can be set. In one example, the high-frequency signals are generated in or on the antenna apparatus 305, for example inside a housing of the antenna apparatus 305. In a further example, the high-frequency signals are generated in the spatial region of the actuator 313.

The antenna apparatus 305 is rotatably mounted by means of a drive shaft of the receiving means 304, and forms an angle α (316), which does not equal 90°, relative thereto. In one example, the angle α=45°. This can advantageously make it possible to record signals from a broad portion of the container 308. If, for example by means of digital beamforming, an angular range of +/−45° of the main emission and/or receiving direction of the antenna apparatus 305 is set, it may be possible in combination with rotation of the antenna apparatus 305 to measure the complete half-space containing the bulk material. However, angles of less than or greater than 45° are also possible in order to avoid ambiguities during digital beamforming for example, and/or for improving the resolution of the measurement. Furthermore, when electronically changing the main emission direction and in the case of very large deflection angles (315), the problem arises whereby the width of the resultant antenna lobe increases significantly. Using systems of this type, it is in principle not possible to electronically change the main emission and/or receiving direction by up to 90° to the vertical. Both problems can be avoided by orienting the antenna apparatus 305 at an angle α (316) to the drive shaft that does not equal 90°.

A plurality of antenna elements 202 (see for example FIG. 2) can be provided along the longitudinal extent of the antenna apparatus 305. Each antenna element 202 can be capable of processing echo signals from different angular directions. Each of the signals received by the antenna elements 202 can be used, with the aid of known algorithms for digital beamforming, to change the receiving angle 315 of the antenna apparatus 305 in a predetermined angular range. The emission and/or receiving angle 315 of the antenna apparatus 305 can, for example, describe a main emission direction with regard to emitting and receiving high-frequency signals.

In one example, a receiving angular range (315) of +/−45° to a perpendicular emission angle relative to the longitudinal extent of the antenna apparatus 305 is selected so that, when taking into account a rotation 310 that also takes place, the entire filling material surface 307 is metrologically recorded within a short amount of time. In other words, the arrangement advantageously combines the advantages of mechanically changing (310) the emission direction with electronically changing a resultant emission/receiving direction 309 of the fill level measurement device 301. In other words, a line scanner (having a recording angle of +/−45°) formed by electronically changing the main receiving direction is linked to a mechanical rotation. In this way, improved measurement rates or shorter measurement times can be achieved. For example, such a measuring cycle for determining a topology of a filling material surface 307 can be less than two seconds. In this case, a mechanically simple structure having low rotational speeds and a greatly simplified electronics system, for example resulting from a unidimensional structure of the antenna apparatus 305, can be advantageous.

The following considerations form the basis of the invention: in order to sufficiently accurately record a topology of a filling material surface 307, it may be necessary to carry out several measurements, each of which records different partial surfaces of the filling material surface 307 to be recorded, from which partial surfaces, as a whole, sufficiently accurate information about the entire filling material surface 307 can be collected. The size of the respective partial surfaces should be selected on the basis of the respective geometric surface structures, dimensions and shapes such that differences in the filling material surface 307 can be sufficiently accurately recorded. In other words, the accuracy of the topology can be increased when the partial surfaces to be recorded or measured are as small as possible. On the other hand, this means that a large number of partial surfaces and thus a large number of individual measurements are required to increase accuracy. Since this can take place for example in a sequential measurement of the individual partial surfaces, it can partly lead to very long measurement times, for example in the region of one to several minutes. Known fill level measurement devices often have high technical complexity in terms of electronics and/or mechanics, together with measurement times that are often long, in order to record filling material surfaces 307. In particular in mechanical structures, high movement speeds of the arrangement are required in order to provide acceptable measurement times, which can lead to high mechanical load and premature wear. The aforementioned disadvantages are avoided by combining a mechanical movement in a first dimension and an electronic change to the main emission and/or receiving direction in a second dimension.

Figure 4:
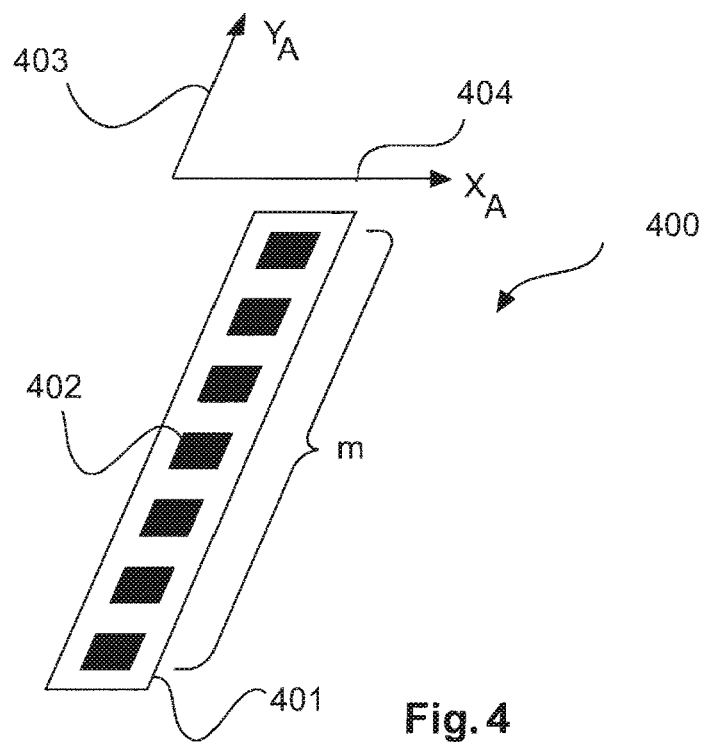
FIG. 4 shows an example of a unidimensional array antenna according to an embodiment of the invention.

FIG. 4 shows an example of an antenna apparatus 400, which is designed as a unidimensional antenna array 401 and consists of m individual antenna elements 402. The antenna elements 401 can be formed by printed circuit board patches having a corresponding design or by suitable waveguide ends or any other known emission apparatuses. In one example, an antenna element 402 arranged in the centre of the antenna array 401 can be used to uniformly emit high-frequency energy towards a filling material surface 307 in as large an angular range as possible. The signals reflected by the filling material surface 307 are received by each of the antenna elements 402 and can optionally be separately forwarded to an evaluation unit (not shown). In this case, the evaluation unit is able to separately record the echo curves received at each of the m antenna elements by means of corresponding devices. Using digital beamforming algorithms, it can then be possible for the evaluation unit to change the emission/receiving angle 309 or main emission/main receiving direction of the antenna apparatus 305, in particular by an angle of +/−45° to a vertical of the antenna apparatus 305, by combining said signals or echo curves. A unidimensional antenna array 401 can thus reduce component complexity in order to provide separate transmission channels and/or receiving channels by reducing the typically two-dimensional arrays 203 (see FIG. 2) to a single dimension. A number of m<=20 elements is typically sufficient for providing the unidimensional array row.

The unidimensional array antenna 401 can achieve very effective focussing of the resultant antenna characteristic curve in the direction of the Y(A) extension 403 by using the downstream algorithms for digital beamforming. In combination with a rotation 310 (see FIG. 3), focussing in the X(A) extension 404 occurs in the radial direction of the rotation. The accuracy of the measurement can, for example, also be improved by downstream signal processing, the Doppler shift resulting from the rotation of the antenna apparatus 305 being evaluated. Algorithms of this type can, for example, adopt the principles of SAR (synthetic aperture radar) and ROSAR (rotor synthetic aperture radar, based on rotating antennas), and as a result lead to focussing of the receiving characteristic curve in the direction of the X(A) extension 404.

Figure 5:
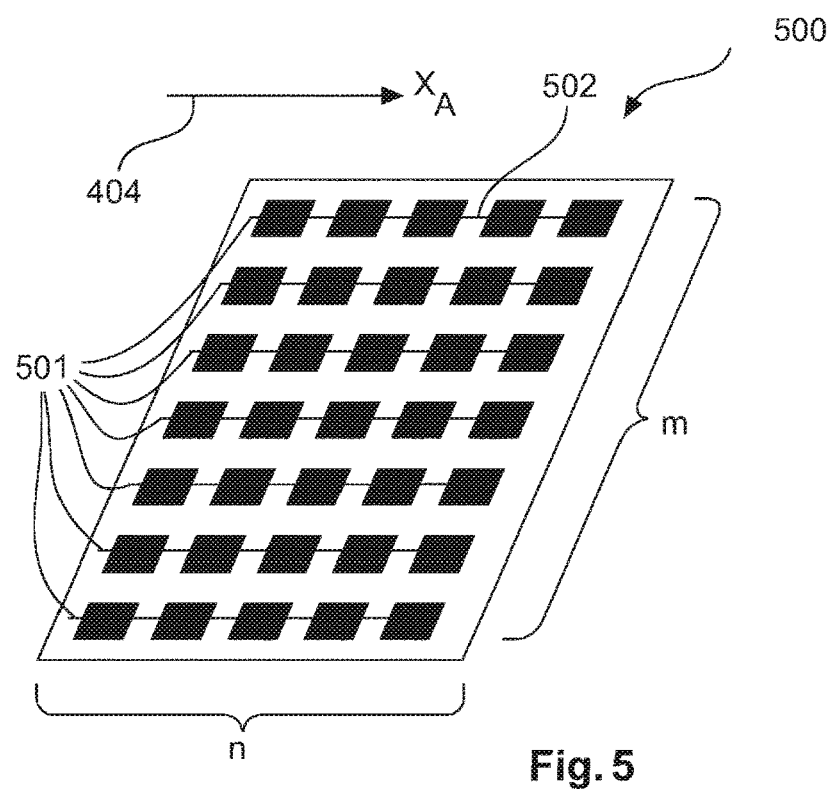
FIG. 5 shows an example of a unidimensional array antenna according to an embodiment of the invention having widened patches.

FIG. 5 shows a further example of an antenna apparatus 500, the individual antenna elements 503 being widened in the X(A) direction 404. In other words, the originally unidimensional antenna array 401 is widened in the direction of the X(A) axis 404 by additional patches or additional antenna elements 501. In order to keep the complexity of the associated electronic actuation system low, the additional patches or antenna elements 501 are arranged at a defined spacing from the antenna elements 402 used thus far and are rigidly connected thereto by means of metal connecting strips 502. In other words, a plurality of interconnected patches act as a single transmission or receiving element or antenna elements 402, but have improved focussing properties in the X(A) direction 404.

Figure 6:
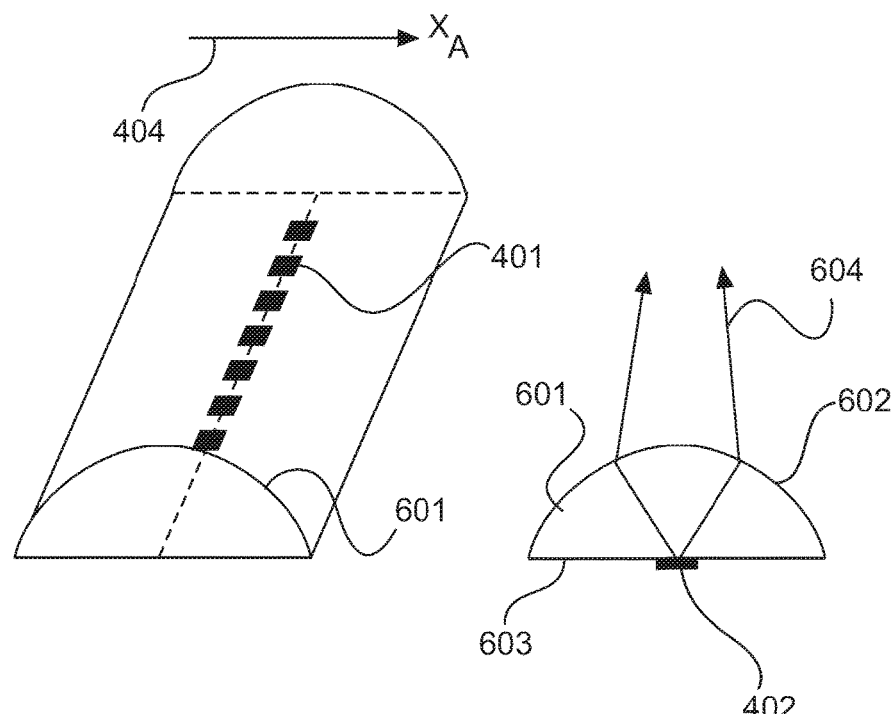
FIG. 6 shows an example of a unidimensional array antenna having a dielectric cylindrical lens according to an embodiment of the invention.

FIG. 6 shows an example of a unidimensional antenna apparatus 401 comprising a dielectric cylindrical lens 602. The arrangement shows an additional embodiment for focussing the signals along the X(A) extension 404. The cylindrical lens 602 is arranged on the antenna apparatus 401 in the emission/receiving direction, so that a signal 604 emitted by an antenna element 402 propagates through the cylindrical lens 602, is refracted at a boundary surface of the cylindrical lens 602 and leaves the cylindrical lens 602 through the curved lens surface. The high-frequency radiation in the X(A) direction 404 can be effectively focussed as a result of the curved boundary surface. When receiving signals, the signal passes through the lens in the opposite sequence.

Figure 7:
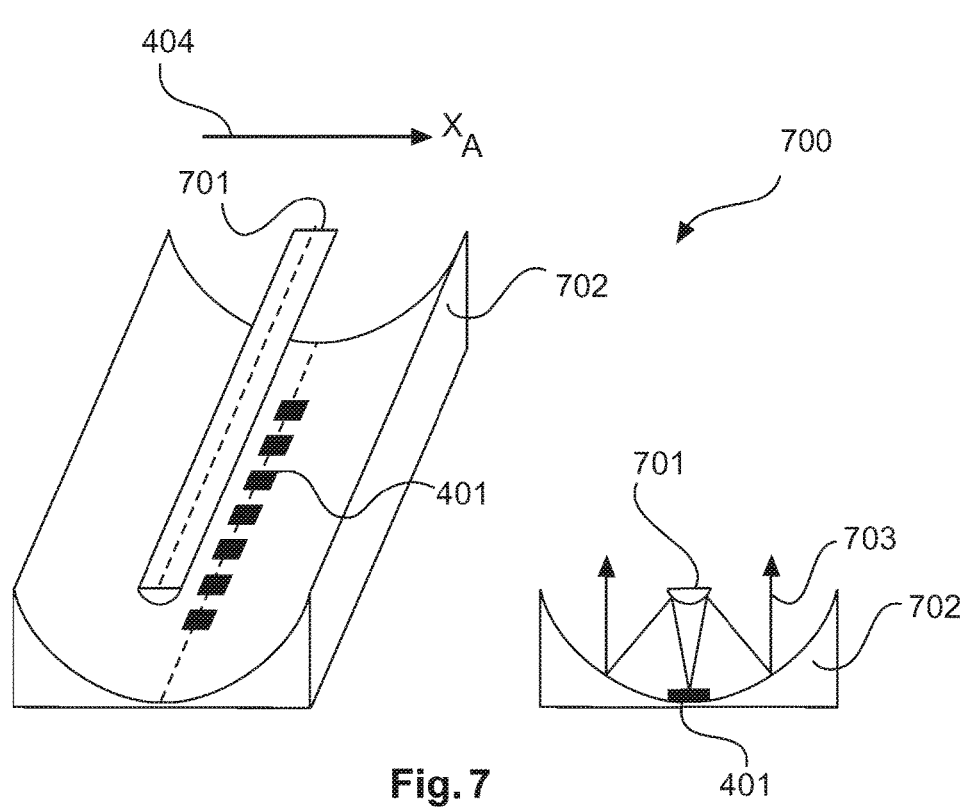
FIG. 7 shows an example of a unidimensional array antenna according to an embodiment of the invention having a parabolic trough as the main reflector and a hyperbolic counter reflector.

FIG. 7 shows an additional advantageous embodiment of an antenna arrangement 700. This arrangement also improves focussing of the signals in the X(A) direction 404. For this purpose, a parabolic trough 702 is used in combination with a correspondingly equipped and positioned counter reflector 701, in order to focus a signal 703 emitted by the antenna apparatus 401. In this case, the signal is first reflected by the counter reflector 701 (for example a hyperbolic trough) and is then reflected again by a surface of the parabolic trough 702. This can make it possible to effectively focus the signal in the direction of the X(A) axis 404.

Figure 8:
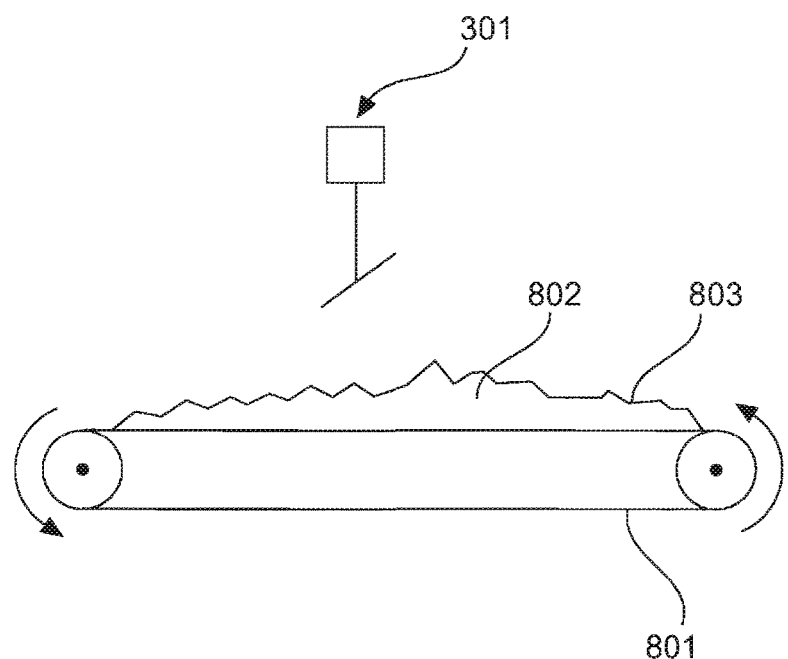
FIG. 8 shows an example of a fill level measurement device according to an embodiment of the invention for determining a mass flow of bulk material on a conveyor belt.

FIG. 8 shows by way of example a use of a fill level measurement device 301 according to the invention for determining a mass flow of moving bulk material 802 on a conveyor belt 801. For this purpose, the fill level measurement device 301 determines a topology of a surface 803 of the bulk material 802. Information about volumes and/or the mass of the bulk material can be gained from the topology information by means of an evaluation unit (not shown). In this case, it can be provided that the antenna is not mechanically adjusted/rotated. The antenna is in this case used as a line scanner.

Figure 9:
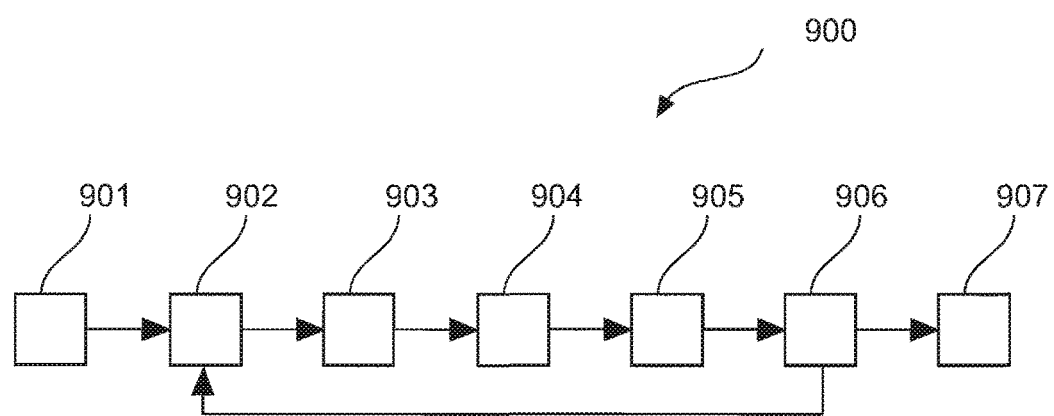
FIG. 9 shows, by way of example, a method for determining a topology of a filling material surface in a container according to an embodiment of the invention.

FIG. 9 shows an example of a method for determining a topology of a filling material surface, for example in a container. In this method, a radiometric fill level measurement device is first provided in step 901. In step 902, an antenna unit is rotated about an axis of rotation, for example a vertical axis of rotation, either continuously or in stages. In step 903, an emission angle of the antenna apparatus is then set by the control unit, the position of the receiving means and the emission angle of the antenna apparatus being set such that a resultant emission direction of the fill level measurement device is directed towards a partial surface of the filling material surface. In step 904, an electromagnetic signal is emitted towards the filling material surface by the control unit and the antenna apparatus. In step 905, an echo signal of the electromagnetic signal is received by the individual elements of the antenna apparatus and the control unit. In this case, echo curves associated with each individual element are generated.

In step 906, echo curves from various main receiving directions of the antenna unit in the angular range to be measured are calculated, by means of digital beamforming, from the previously generated echo curves of the individual receiving elements using known algorithms of digital beamforming. This step corresponds to the change in the main receiving direction in the Y(A) extension (403).

The method then reverts back to step 902, followed by steps 903, 904 and 905, followed by a repeated digital scan over the angular range to be measured by means of digital beamforming 906.

Steps 902-906 can then be carried out as many times as necessary until a complete data set (a plurality of digital scans along the longitudinal axis of the antenna per revolution) is recorded.

Finally, in step 907 the topology of the filling material surface is calculated by an evaluation unit on the basis of the echo signals that are received by the antenna apparatus and calculated by means of digital beamforming. In other words, a concept of the method can be considered that of sequentially sampling partial surfaces of a filling material surface and determining a topology of the filling material surface on the basis of the echo signals obtained. For this purpose, a position of the antenna apparatus is mechanically set, an emission and/or receiving angle of the antenna apparatus is electronically set and a resultant emission and/or receiving direction of the fill level measurement device is consequently set in each case.

It should additionally be pointed out that "comprising" does not exclude the possibility of further elements or steps, and "a", "an" or "one" does not exclude the possibility of a plurality. It should further be noted that features or steps which have been described with reference to one of the above embodiments may also be used in combination with other features or steps of other above-described embodiments. Reference numerals in the claims should not be deemed to have a limiting effect.

The invention claimed is:

1. A fill level measurement device for determining a topology of a filling material surface, comprising:
an antenna apparatus, comprising an array antenna and configured to emit and/or receive electromagnetic signals;
a receiver; and
control circuitry,
wherein the antenna apparatus is fastened to the receiver,
wherein a plurality of emission and/or receiving angles of the antenna apparatus are electronically settable by digital beam forming or analogue phase shifting,
wherein the receiver is configured to mechanically set a position of the antenna apparatus relative to the filling material surface, and
wherein, with the aid of the antenna apparatus, the control circuitry is configured to record a plurality of echo signals from different regions of the filling material surface by combining mechanically positioning the antenna apparatus with electronically setting the emission and/or receiving angle of the antenna apparatus.

2. The fill level measurement device according to claim 1, wherein the control circuitry is configured to set both a predetermined position of the antenna apparatus relative to the filling material surface and a certain emission and/or receiving angle of the antenna apparatus, in order to record electromagnetic signals from a specific region of the filling material surface.

3. The fill level measurement device according to claim 1, wherein a plurality of emission and/or receiving angles are electronically set using analogue phase shifters and/or analogue switches.

4. The fill level measurement device according to claim 1, wherein a plurality of emission and/or receiving angles are electronically set using digital beamforming methods.

5. The fill level measurement device according to claim 1, wherein the receiver comprises an actuator configured to move the antenna apparatus; and
wherein the control controller is configured to control the actuator.

6. The fill level measurement device according to claim 5, wherein the receiver is configured to rotate the antenna apparatus about an axis of rotation; and
wherein the actuator is a motor configured to rotate the receiver.

7. The fill level measurement device according to claim 1, wherein the antenna apparatus comprises a unidimensional array antenna and has an elongate shape.

8. The fill level measurement device according to claim 7, wherein the longitudinal extent of the antenna apparatus is arranged obliquely to the axis of rotation such that an angle between the longitudinal extent of the antenna apparatus and the axis of rotation does not equal 90°.

9. The fill level measurement device according to claim 8, wherein the longitudinal extent of the antenna apparatus is arranged obliquely to the axis of rotation such that an angle between the longitudinal extent of the antenna apparatus and the axis of rotation is more than 45°.

10. The fill level measurement device according to claim 1, wherein the antenna apparatus comprises a parabolic trough, a dielectric cylindrical lens and/or widened patches in order to improve focussing.

11. The fill level measurement device according to claim 1, wherein the control circuitry is further configured to calculate a topology of a filling material surface on the basis of the echo signals received by the antenna apparatus.

12. The fill level measurement device according to claim 1, further comprising:
a position sensor configured to detect a spatial position of the antenna apparatus relative to the filling material surface and to provide the control circuitry with corresponding spatial positional information relating to the antenna apparatus.

13. The fill level measurement device according to claim 1, further comprising:
a power supply and communication interface configured to connect the fill level measurement device to a two-wire line, by which the fill level measurement device is supplied with power required for the measurement operation and by which measured data is transmitted to remote control circuitry.

14. A method for determining a topology of a filling material surface with a fill level measurement device including an antenna apparatus having an array antenna and configured to emit and/or receive electromagnetic signals, a receiver, and control circuitry, wherein the antenna apparatus is fastened to the receiver, wherein a plurality of emission and/or receiving angles of the antenna apparatus are electronically settable by digital beam forming or analogue phase shifting, wherein the receiver is configured to mechanically set a position of the antenna relative to the filling material surface, and wherein, with the aid of the antenna apparatus, the control circuitry is configured to record a plurality of echo signals from different regions of the filling material surface by mechanically positioning the antenna apparatus with electronically setting the emission and/or receiving angle of the antenna apparatus, the method:
- setting a first position of the receiver and of the antenna apparatus by the control circuitry;
- recording a plurality of echo curves by electronically setting a plurality of emission and/or receiving angles by the control circuitry;
- setting a second position of the receiver and of the antenna apparatus by the control circuitry; and
- recording a plurality of echo curves by electronically setting a plurality of emission and/or receiving angles by the control circuitry.

15. The method according to claim 14, further comprising:
- calculating, by the control circuitry, a topology of a filling material surface using the echo signals received by the antenna apparatus.

16. The fill level measurement device according to claim 1, wherein the device is further configured to determine a viscosity of a filling material.

17. The fill level measurement device according to claim 1, wherein the device is configured to determine the mass or volume of a medium.

* * * * *